US009652632B2

(12) United States Patent
Dong et al.

(10) Patent No.: US 9,652,632 B2
(45) Date of Patent: May 16, 2017

(54) METHOD AND SYSTEM FOR REPAIRING FILE AT USER TERMINAL

(71) Applicant: BEIJING QIHOO TECHNOLOGY COMPANY LIMITED, Beijing (CN)

(72) Inventors: Yi Dong, Beijing (CN); Junxiang Xie, Beijing (CN); Xuping Liu, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 21 days.

(21) Appl. No.: 14/409,623

(22) PCT Filed: May 9, 2013

(86) PCT No.: PCT/CN2013/075390
§ 371 (c)(1),
(2) Date: Dec. 19, 2014

(87) PCT Pub. No.: WO2013/189214
PCT Pub. Date: Dec. 27, 2013

(65) Prior Publication Data
US 2015/0205979 A1    Jul. 23, 2015

(30) Foreign Application Priority Data
Jun. 19, 2012  (CN) .......................... 2012 1 0208665

(51) Int. Cl.
*G06F 21/64* (2013.01)
*G06F 21/56* (2013.01)
*G06F 17/30* (2006.01)
(52) U.S. Cl.
CPC ........ *G06F 21/64* (2013.01); *G06F 17/30144* (2013.01); *G06F 21/565* (2013.01); *G06F 21/568* (2013.01)

(58) Field of Classification Search
CPC ...... G06F 21/64; G06F 21/565; G06F 21/568; G06F 21/56; G06F 21/566;
(Continued)

(56) References Cited

U.S. PATENT DOCUMENTS 5,852,713 A * 12/1998 Shannon ............. G06F 11/1451
707/999.102
6,658,476 B1 * 12/2003 Van ......................... H04L 67/42
709/223

(Continued)

OTHER PUBLICATIONS

International Search Report regarding PCT/CN2013/075390 issued Aug. 15, 2013, two pages.
(Continued)

*Primary Examiner* — Carl Colin
*Assistant Examiner* — Vance Little
(74) *Attorney, Agent, or Firm* — James M. Stipek; John R. Bednarz; Polsinelli PC

(57) ABSTRACT

Provided are a method and system for repairing a file at user terminal. The method comprises: scanning a file at user terminal, determining whether the file is abnormal, and acquiring file characteristics information; if the file is abnormal, then according to the file characteristics information, acquiring from a cloud server a secure file corresponding to the abnormal file and uploaded before abnormity occurring, wherein the secure file in the cloud server is acquired by directly uploading file of user terminal; and replacing the corresponding abnormal file of the user terminal with the secure file. The method and system save the secure files of each user terminal in a cloud server, and when an abnormal file occurs in the user terminal, download the secure version of a corresponding file from the cloud server to replace the local abnormal file, thus ensuring recovery of the correct version of the file into the system, and solving the problems that the abnormal file cannot be restored to normal status (Continued)

during the conventional file repair process or cannot be repaired due to complexities caused by virus infection.

19 Claims, 4 Drawing Sheets

(58) Field of Classification Search
CPC ........ G06F 17/30144; G06F 8/65; G06F 8/67; G06F 8/68; G06F 8/70–8/72
See application file for complete search history.

(56) References Cited

U.S. PATENT DOCUMENTS

| 7,836,174 | B2 | 11/2010 | Lunde | |
|---|---|---|---|---|
| 2001/0005889 | A1* | 6/2001 | Albrecht | G06F 21/56 |
| | | | | 726/24 |
| 2006/0272021 | A1* | 11/2006 | Marinescu | G06F 21/56 |
| | | | | 726/24 |
| 2010/0031361 | A1* | 2/2010 | Shukla | G06F 21/568 |
| | | | | 726/24 |
| 2010/0223274 | A1* | 9/2010 | DeHaan | G06F 17/30144 |
| | | | | 707/758 |
| 2010/0262584 | A1* | 10/2010 | Turbin | G06F 21/564 |
| | | | | 707/674 |
| 2011/0225128 | A1* | 9/2011 | Jarrett | G06F 8/61 |
| | | | | 707/692 |

OTHER PUBLICATIONS

English translation of abstract only of Chinese application CN102332071 A, Title: Methods and devices for discovering suspected malicious information and tracking malicious file, Publication Date: Jan. 25, 2012, Country: CN Inventor(s): Cong Zhang et al., one page.
English translation of abstract only of Chinese application CN102360320 A, Title: Terminal backup object sharing and recovery method based on cloud architecture, Publication Date: Feb. 22, 2012, Country: CN Inventor(s): Zhizhou Zhang et al., one page.

* cited by examiner

METHOD AND SYSTEM FOR REPAIRING FILE AT USER TERMINAL

FIELD OF THE INVENTION

The present invention relates to the technical field of security, and particularly to a method and system for repairing a file at user terminal.

BACKGROUND OF THE INVENTION

File infection is a technology often used by a virus and Trojan and occurred in a long past. This technology involves adding a virus code to a code of a normal program to achieve synchronous running along with the infected program, thereby destroying the infected computer and spreading on its own, and performing vicious behaviors such as theft of user's password or virtual assets and upload the user's sensitive information. For the user's convenience, the infected file generally needs to be repaired.

In the prior art, the repair procedure of the infected file is deletion of the malicious code inserted in the normal file. The procedure is generally as follows: the user terminal scanning files→finding the infected file→locating the malicious code such as the virus or Trojan in the file code→deleting the malicious code portion according to the located malicious code such as the virus or Trojan. However, in practice, since the virus has too many variants after combating against security software, processing the infected file by the current method has the following drawbacks: (1) complete repair is hard to achieve; (2) after being repaired, many files still have residual malicious code; (3) many files cannot be executed normally after being repaired (individual files might cause system failure or failure to normally use the application software); (4) when files cannot be repaired (e.g., over 80% of the file is infected, it is almost impossible to delete the malicious code from the original file code), they have to be isolated (deleted); (5) when crucial files of the system cannot be repaired, the user does not venture to delete them and have to retain them. In one word, the current file repair technology substantially cannot ensure complete deletion of the malicious code from the infected file, nor can ensure the file normal.

SUMMARY OF THE INVENTION

In view of the above problems, the present invention is proposed to provide a method and system for repairing a file at user terminal, which can overcome the above problems or at least partially solve or ease the above problems.

According to an aspect of the present invention, there is provided a method for repairing a file at user terminal, comprising: scanning a file at user terminal, judging whether the file is abnormal, and acquiring file characteristics information; if the file is abnormal, acquiring, according to the file characteristics information, from a cloud server a secure file corresponding to the abnormal file and uploaded before abnormity occurring, wherein the secure file in the cloud server is acquired by directly uploading the file of user terminal; replacing the corresponding abnormal file of the user terminal with the secure file.

According to another aspect of the present invention, there is provided an apparatus for repairing a file at user terminal, comprising: an infection scanning module configured to scan a file at user terminal, judge whether the file is abnormal, and acquire file characteristics information; a secure file obtaining module configured to, if the file is abnormal, acquire, according to the file characteristics information, from a cloud server a secure file corresponding to the abnormal file and uploaded before abnormity occurring, wherein the secure file in the cloud server is acquired by directly uploading the file of user terminal; a replacing module configured to replace the corresponding abnormal file of the user terminal with the secure file.

According to another aspect of the present invention, there is provided a computer program which comprises a computer readable code; when the computer readable code is run on a server, the server executes the method for repairing a file at user terminal according to any one of claims 1-12.

According to a further aspect of the present invention, there is provided a computer readable medium which stores the computer program according to claim 25.

Advantageous effects of the present invention are as follows:

According to the present invention, the secure files of each user terminal are saved in a cloud server, and when an abnormal file occurs at the user terminal, the secure version corresponding to the abnormal file is downloaded from the cloud server to replace the local abnormal file, thus ensuring recovery of the correct version of the file into the system, and solving the problems that the abnormal file cannot be restored to normal status during the conventional file repair process or cannot be repaired due to complexities caused by virus infection and key system files.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

The present invention will be further described below with reference to figures and specific embodiments.

The present invention may timely and accurately upload secure versions of files of user terminals to and store them in a cloud server, and when an abnormal file occurs in the user terminal, acquire a secure file corresponding to the abnormal file from the cloud server to the user terminal according to relevant file characteristics information of the abnormal file, then use the secure file to replace the corresponding abnormal file of the user terminal.

Preferably, the present invention is adapted to executable files at the user terminal system, for example, PE files in Windows system (PE file means Portable Execute file; PE file is a program file on Microsoft Windows operating system. EXE, DLL, OCX, SYS and COM are common PE files), and for example executable files (e.g., system files) in a mobile terminal (e.g, a smart mobile phone). Since the above-mentioned classes of files at the user terminals are substantially the same (e.g., in the Windows XP system, system files therein are substantially the same), the cloud server may have relatively sufficient space to store the aforesaid files.

Figure 1:
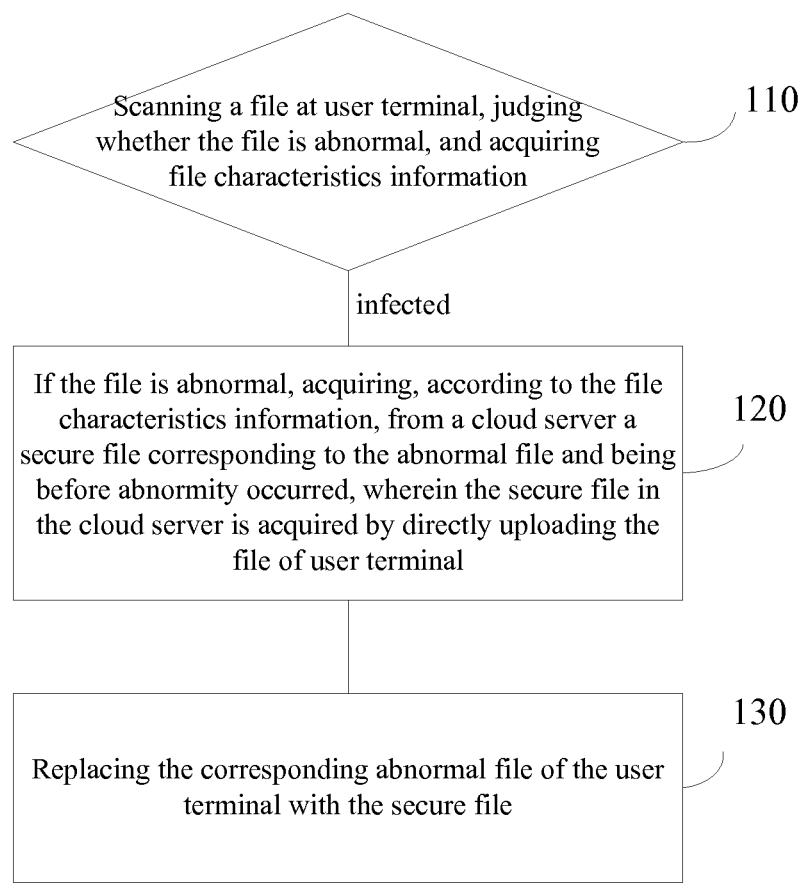
FIG. 1 illustrates a flow chart of a method for repairing a file at user terminal according to an embodiment of the present invention.

Referring to FIG. 1, FIG. 1 illustrates a flow chart of a method for repairing a file at user terminal according to the present invention, specifically comprising:

Step 110: scanning a file at user terminal, judging whether the file is abnormal, and acquiring file characteristics information;

In the embodiments of the present invention, judgment of whether the file is abnormal may be conducted by the user terminal or the server of the cloud server. The file characteristics information of the corresponding file may be acquired upon scanning. The file characteristics information comprises an MD5 value (Message Digit Algorithm MD5), storage path of the file at the user terminal et.al. The file characteristics information comprises information for querying whether the corresponding file is stored at the cloud server.

Wherein, the file characteristics information comprises the MD5 value of the file content, and/or storage path information of the file, and/or change information of the file. In the embodiments of the present invention, the file characteristics information may comprise an MD5 value of the file content, an MD5 value of the file path, change information of the file, timestamp et.al.

Regarding the abnormal file, there are many situations:

Firstly, for a system file, whether the system file is normal may be judged by setting "file white list+file signature" in security monitoring in the embodiments of the present invention. When the system file does not have one of them, the system file may be regarded as an abnormal file, i.e., when the system file is not in the file white list and/or the file signature is incorrect, the system file may be regarded as abnormal, wherein the file signature is for example the MD5 value of the file content.

Secondly, for an executable file complied by an individual, whether it is abnormal may be judged by scanning and judging whether it is infected (poisoned).

In the present invention, there are many methods for judging whether a file is infected, for example, characteristics code method, and checksum method. These methods need different overheads upon implementation according to different principles, and have different detection ranges and have their respective advantages.

1. Steps for implementing the characteristics code method are as follows:

A known virus file is collected. If the virus infects a COM file as well as an EXE file, a COM type virus file and an EXE type virus file need to be collected simultaneously for this virus.

The characteristics code is extracted from the virus file on the following principle:

The extracted code is relatively special and is unlikely to conform to an ordinary normal program code. The extracted code should have a proper length to, on the one hand, maintain uniqueness of the characteristics code and, on the other hand, ensure not too large space and time overhead. If the characteristics code of a virus increases by one byte, 3000 kinds of viruses need to be detected and the increased space is 3000 bytes. On the premise of maintaining uniqueness, the length of the characteristics code is made as short as possible to reduce the space and time overhead.

In the virus file infecting the COM file as well as the EXE file, a code shared by the two kinds of files should be extracted, and the characteristics code is directed to a virus database.

The file to be detected is opened, and search is performed in the file to check whether the file contains the virus characteristics code in the virus database. If the virus characteristics code is found, it may be judged what virus is contained in the checked file since the characteristics code is corresponding to the virus.

2. The checksum method

A checksum is calculated for the normal file content, and the checksum is written in the file or written into another file for storage. During use of the file, regularly or before using the file every time, checking is performed as to whether a checksum calculated from current content of the file is consistent with the originally-stored checksum, thereby determining whether the file may be infected with the virus. This method is called checksum method.

There are three ways for using the checksum method to check virus:

① The checksum method is introduced in a virus detection tool, a normal-state checksum is calculated for the checked object file, and the checksum value is written in the checked file or the detection tool for comparison.

② An self-check function of the checksum method is introduced in an application program, a normal-state checksum of the file is written into the file itself, the current checksum is compared with the original checksum value whenever the application program starts, thereby achieving self-detection of the application program.

③ The checksum check program is made permanently reside in the memory, and checksums pre-stored in the application program or other files are automatically compared and checked whenever the application program begins to run.

There are many methods for checking whether files are infected with viruses. The present invention does not limit this.

Step 120: if the file is abnormal, acquiring, according to the file characteristics information, from a cloud server a secure file corresponding to the abnormal file and being before the abnormality occurred, wherein the secure file in the cloud server is acquired by directly uploading the file of user terminal;

If abnormity of the file is found through scanning, query is performed to the cloud server for a secure version of file corresponding to the abnormal file according to the file characteristics information, and then the user terminal downloads the secure file from the cloud server to the local memory. For example, if the user's bass_aac.dll file is abnormal, a corresponding secure bass_aac.dll file is looked up from the cloud server according to the file characteristics information of the bass_aac.dll file, for example, the MD5 value of the file content and the MD5 value of the storage path, and then the user terminal downloads the secure bass_aac.dll file to the local memory.

The file characteristics information used by the cloud server upon storing the file may include the file name, the MD5 value of the file content and the like. A file according to embodiments of the present invention may be stored in a sole manner, i.e., the same file is stored in only one copy and not stored repeatedly. Then, the file characteristics information of corresponding identical files of different user terminals is corresponding to the files in a multiple-to-one manner. For example, almost every user terminal has the aforesaid bass_aac.dll file in the Windows system, then the cloud server only stores one copy of bass_aac.dll file, and then file characteristics information of the user terminals exist in a manner that bass_aac.dll+corresponding MD5 value correspond to the bass_aac.dll.

In embodiments of the present invention, secure files in the cloud server may be obtained by directly uploading the file of user terminal, that is to say, files stored in the cloud server may be totally uploaded by the user terminal, or files with a high repetition rate in the user terminals may be organized and uploaded by the cloud server itself, instead of being uploaded by user terminals. For example, various Windows system files are substantially the same, so the cloud server itself may upload and store the Windows system files. Besides, for example, it is the same with UNIX system files and system files of a smart mobile phone (e.g., Android system files). Upon uploading files of user terminals, the aforesaid already-uploaded files may not be uploaded, thereby saving uploading time and improving efficiency.

The uploading according to the present invention is directly uploading from the user terminals (e.g., n hundred million users in a certain region) to the cloud server.

Step 103: replacing the corresponding abnormal file of the user terminal with the secure file.

When the user terminal obtains a secure version of file corresponding to the abnormal file, the abnormal file is replaced with the secured file.

If the secure version of the file corresponding to the abnormal file cannot be found from the cloud server, a conventional repair technology may be employed.

Wherein, replacing the corresponding abnormal file of the user terminal with the secure file comprises:

when the abnormal file or the infected unknown file has limits of operation authority, obtaining the operation authority of the file by invoking an authority obtaining function; the authority obtaining function is in a lower layer than a system authority authentication function layer;

replacing the abnormal file or unknown file with the corresponding secure file after obtaining the operation authority of the file.

In this way, the abnormal file of the user terminal is restored to a secure file, and problems such as incomplete repair caused by the conventional repair technology or failure to repair due to complexities caused by virus infection are avoided.

In addition, according to the present invention, after finding out the file abnormity, further comprises:

prompting the user terminal whether to permit replacement of the abnormal file.

For example, after finding out the file abnormity, the user terminal is asked whether to permit downloading the secure version of file and replacing the abnormal file with the secure file, before the secure file corresponding to the abnormal file and being before abnormity occurred is downloaded from the cloud server.

If the user terminal does not permit, the conventional repair technology may be employed to repair the abnormal life.

The present invention may replace system files (including versions of operating systems Windows 2000, xp, 2003, vista, Windows 7 and Windows 8) and third-party commonly-used software (e.g., QQ, Thunder, Fetion, 306 software series). Besides the above system files and third-party commonly-used software, the present invention may further replace files including all executable files used on the user terminal machine.

In the present invention, the replaceable files mainly rely on the white list's collection of files and software, and all files or softwares collected by the white list are replaceable. Upon collecting replaceable files and software, the white list may judge whether they are executable files, or whether they are replaceable files through extension names (.com, .exe, .dll and so on) of files.

Figure 2:
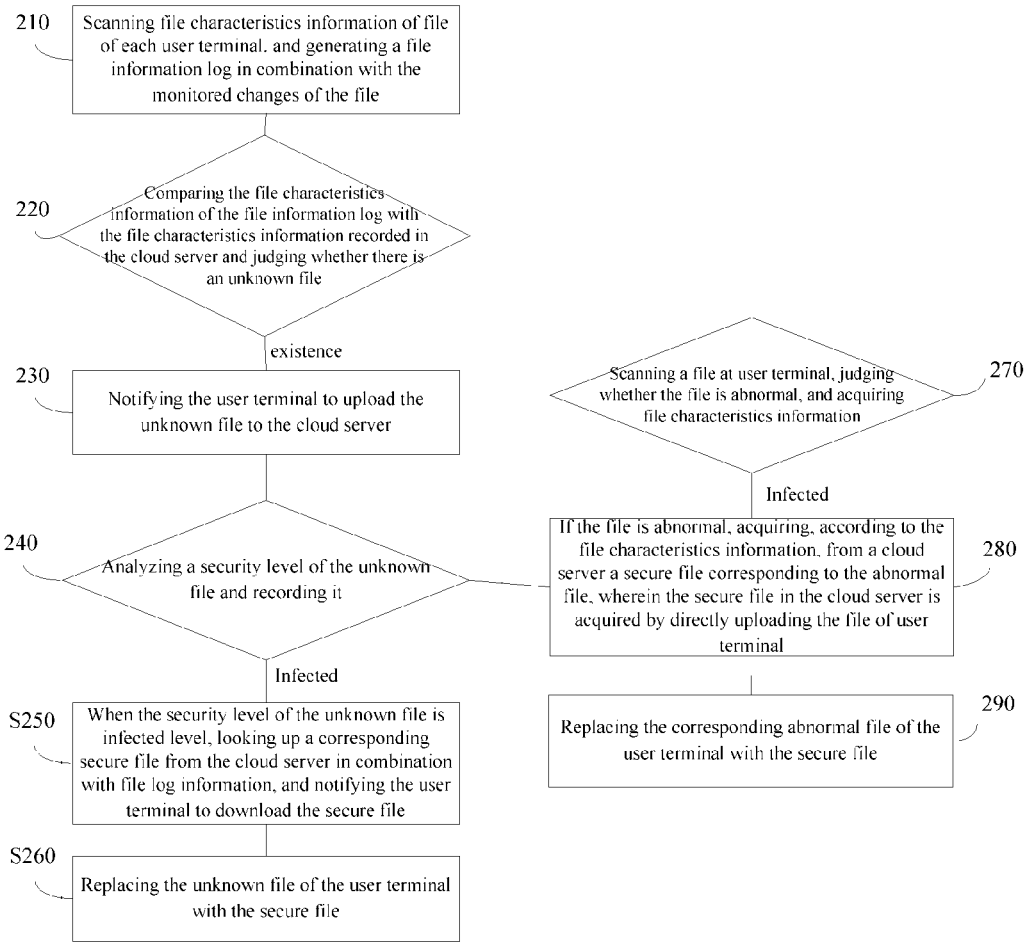
FIG. 2 illustrates a flow chart of a method for repairing a file at user terminal according to an embodiment of the present invention.

Referring to FIG. 2, FIG. 2 illustrates a flow chart of a method for repairing a file at user terminal according to a preferred embodiment of the present invention, specifically comprising:

Step 210: scanning file characteristics information of the file at each user terminal, and generating a file information log in combination with the monitored changes of the file;

In this step, the file characteristics information of the file is firstly scanned with respect to each user terminal, and the file formation log is generated in combination with the monitored changes of the file. In embodiments of the present invention, what is scanned firstly may be the MD5 value of the file content, and then the file information log is generated in combination with file name, file path, file changes and the like of the current file, wherein the file changes comprise the following case: if a storage path of a file having the same MD5 is altered, the change of its storage path is recorded. For example, if the file A.exe has an original path D:\A\A and the user moves it to E:\A\A and modifies its name as B.exe, the monitoring of the file records that B.exe in E:\A\A is changed from A.exe in D:\A\A, and the movement information is also recorded upon generating the file log information.

In embodiments of the present invention, when a file storage environment is initially installed at the user terminal and the user terminal system is ensured safe, the file at the user terminal system is scanned to generate a log, and then files not stored by the cloud server are uploaded to the cloud server for storage. Then the method proceeds to step 210. Upon initial use, the user may also directly enter step 210.

Step 220: comparing the file characteristics information of the file information log with the file characteristics information recorded in the cloud server and judging whether there is an unknown file;

According to embodiments of the present invention, storing files related to the user terminal in the cloud server may be acquired by uploading the files at user terminal.

When the file information log is obtained, whether there exists an unknown file may be judged by comparing the file characteristics information in the file information log with the file characteristics information recorded by the cloud server. For example, since the cloud server records the file name and MD5 value of the stored file, the MD5 value in the file log information may be compared with the MD5 value in the file characteristics information recorded by the cloud server: if it does not exist, it is judged as an unknown file relative to the cloud server.

Then, the file characteristics information of the file which is in the user terminal log information and judged by the cloud server as unknown file is notified to the user terminal.

Preferably, comparing the file characteristics information of the file information log with the file characteristics information recorded in the cloud server and judging whether there is an unknown file comprises:

Step S10: comparing the file log information currently generated by the user terminal with previously-recorded file log information of the user terminal, and judging whether there exists a first unknown file log information which does not exist in the file log information recorded by the cloud server and corresponding to the user terminal;

As for a user terminal which has already used embodiments of the present invention at least once, embodiments of the present invention may record the file log information generated upon scanning before the current scanning. For example, upon scanning for the first time, the user terminal generates one file log information which is recorded, file log information generated by the user terminal upon scanning for a second time may be compared with the previously-recorded file log information to perform judgment of the first unknown file characteristics information to obtain the first unknown file log information.

Regarding the embodiments of the present invention, when the user terminal uses for the first time, an optimal initial environment is a secure environment with no abnormal file, for example, secure environment after the initial installation. For a user terminal using the embodiment of the present invention for the first time, its initial environment is a secure environment, initial file log information may be generated therefor and the file log information corresponds to the relevant file characteristics information of each secure file of the user terminal.

In embodiments of the present invention, the file log information prior to the log information currently generated by the user terminal may be recorded by the user terminal itself, or recorded by the cloud server. When it is recorded by the cloud server, it is recorded corresponding to an identifier of the user terminal to avoid confusion of the file log information. If the recording is performed by the cloud server, preferably a log server may be individually divided from the cloud server for recording.

In addition, preferably, a file server may be individually divided for the updated files to store the files uploaded by the user terminal, then the file characteristics information is allowed to correspond to the corresponding file, wherein upon storing files, unsecure files and secure files may be stored separately.

Preferably, comparing the file log information currently generated by the user terminal with previously-recorded file log information of the user terminal, and judging whether there exists a first unknown file log information which does not exist in the file log information recorded by the cloud server and corresponding to the user terminal:

Step S11: uploading the file log information currently generated by the user terminal to the cloud server;

Step S12: comparing the file log information currently received by the cloud server with the file information log recorded by the cloud server and corresponding to the user terminal, and obtaining the first unknown file log information which does not exist in the file log information recorded by the cloud server and corresponding to the user terminal.

When the file log information is recorded by the user terminal itself, when the first unknown file log information is obtained, the first unknown file log information is sent to the cloud server to enter step S12. When the cloud server records the user terminal's file log information, the user terminal firstly uploads the current file log information to the cloud server, the cloud server compares the file log information currently uploaded by the user terminal with the previous file log information recorded by the cloud server and corresponding to the user terminal, and judges whether there exists the first unknown file log information which does not exist in the file log information recorded by the cloud server and corresponding to the user terminal. In the event of existence, the flow turns to step S12. The first unknown file log information is absent in the file log information stored in the cloud server and corresponding to the user terminal when comparing the file log information currently uploaded with the file log information recorded by the cloud server and corresponding to the user terminal.

In the embodiments of the present invention, the file characteristics information used by the cloud server upon storing the file may include the file name, the MD5 value of the file content and a file path at user terminal; As to a file, a timestamp upon uploading the file or a corresponding version number may be added as a version identifier, and meanwhile a security level of the file may be identified, in the embodiments of the present invention, the security level is generally identified for the MD5 value of the file path. That is to say, the file characteristics information in the embodiments of the present invention is stored in the following form: "file name: PATH (file path at user terminal MD5)+TEXT (file content MD5)", wherein security level is identified for the PATH. Preferably, the file characteristics information may further be stored in the following form: "file name: PATH (path MD5)+TEXT (file content MD5)+VERSION (version identifier)", wherein the security level is identified for the PATH. In the present embodiment, upon uploading, the user terminal's ID may be uploaded, and the user terminal's ID is stored together when the file information is stored. The user terminal ID could be a serial number (e.g., a currently-used MID) which is generated for example according to the hardware of the user terminal machine, or is generated by using an account number registered by the user at the cloud server in combination with the MID.

Preferably, storing the file log information comprises:

Step A11: structuring the file characteristics information with a structure including the file path at user terminal, a characteristic value corresponding to the file content and file version to obtain the structured file characteristics information;

i.e., the aforesaid form "file name: PATH (file path at user terminal MD5)+TEXT (file content MD5)".

Step A12: identifying security level for the structured file characteristics information according to the security level of the file, and storing the structured file characteristics information with security level identified in a file information log corresponding to the user terminal.

Step S20: if there exists the first unknown file log information, comparing the file characteristics information in the first unknown file log information with the file characteristics information recorded in the cloud server, and judging whether there exists an unknown file.

In step S20, if the first unknown file log information is obtained, comparing the file characteristics information in the first unknown file log information with the file characteristics information recorded in the cloud server, and judging whether there exists an unknown file.

Step 230: if there exists an unknown file, notifying the user terminal to upload the unknown file to the cloud server;

Since the cloud server stores files uploaded by each user terminal, the file corresponding to the file characteristics information of the first unknown file log information from comparison of new and old file log information of a certain user terminal might have been uploaded by other user terminals, and the file characteristics information related to the file has already been recorded in the cloud server. In this case, the file characteristics information in the first unknown file log information is not an unknown file for the cloud server, and the user terminal may not be notified to upload the file corresponding to the file characteristics information.

In the cloud server, the stored file may correspond to file characteristics information by a certain rule, and be used to compare with the file characteristics information uploaded by the user terminal, and a corresponding file is searched and queried. For example, the MD5 value of the file corresponds to the file.

The uploading according to the present invention is directly uploading from the user terminals (e.g., n hundred million users in a certain region) to the cloud server. In the present embodiment, it is necessary to judge whether the file needs to be uploaded before the uploading, i.e., perform judgment of repetition as compared with the files stored by the cloud server.

Besides, it is found by the inventor during implementation of the present invention that the reason for problems such as a low uploading success rate and efficiency existing in the prior art is that a user finding a suspicious file directly uploads the whole file to the server so that if the file is too large and an uploading bandwidth that may be used by the user terminal is relatively small, failure to upload might be caused. Besides, if only one user terminal is used to upload the same file, this causes a relatively heavy uploading burden of the user terminal and also causes the uploading speed very slow.

Therefore, in the present embodiment of the present invention is employed a mechanism of fragmenting and concurrent uploading of a plurality of user terminals. As such, on the one hand, since the file is fragmented, uploading failure due to the too large file can be avoided, and the uploading success rate is improved; on the other hand, if a plurality of user terminals all find the same suspicious file, the plurality of user terminals may concurrently upload different fragments of the suspicious file, so the uploading burden of an individual user terminal can be reduced, limitation of an uploading bandwidth of one user terminal can be avoided, and the uploading efficiency can be improved.

Therefore, preferably, upon notifying the user terminal to upload the unknown file to the cloud server, the method comprises:

Step L1: the user terminal receiving a fragmenting policy returned by the cloud server, and fragmenting the file to be uploaded according to the fragmenting policy;

In the present embodiment, the fragmenting policy is returned by a management server of the cloud to the user terminal to fragment the file to be uploaded.

After the user terminal receives the fragmenting policy returned by the management server of the cloud, the file to be uploaded may be fragmented, and meanwhile, each fragment may be allocated a fragment serial number (how to number the fragments specifically may also be included in the fragmenting policy). After the fragmentation, each fragment is still in the original data format, and may retain the identifier of the original file, but it only contains partial data of the original file. Furthermore, upon completion of the fragmenting, each fragment may be transferred as an independent data transmission unit. The specific fragmenting method may employ the method in the prior art and will not be detailed here.

Step L2: the user terminal uploading the file to the cloud server with the fragment as a unit, wherein if different user terminals find the same file to be uploaded, different fragments of the same file to be uploaded are uploaded concurrently by the respective user terminals.

In the present embodiment, the user terminal uploads the file to the data server of the cloud with the fragment as a unit.

After completion of the fragmenting, the user terminal may upload the file with the fragment as a unit. Furthermore, since it is possible that a plurality of user terminals find the same file, partial fragments are uploaded by these user terminals respectively, thereby avoiding too heavy uploading burden of one user terminal. Moreover, since a plurality of user terminals may upload concurrently, the uploading efficiency may be substantially improved.

When the user terminal uploads the fragments, it sends a file uploading request to the management server in order of fragment serial numbers. The management server determines whether the current user terminal needs to upload the current fragment according to the uploaded fragments of the file by other user terminals; if necessary, it sends an instruction to the user terminal to upload, the user terminal receives a response message that the current fragment needs to be uploaded and then uploads the current fragment to the data server, otherwise the fragment needn't be uploaded.

For example, assume that the file is divided into three fragments, when user terminal A requests to upload fragment 1 of the three fragments, if other user terminals have already uploaded or are uploading the fragment, the management server instructs the user terminal A not to upload the fragment; after the user terminal A receives the instruction, it may abandon the uploading request for fragment 1 and then sends the management server a request to upload fragment 2.

If the fragment 1 has not yet been uploaded to the data server and no other user terminals are uploading the fragment 1 after the user terminal A's request to upload the fragment 1 is received, the management server sends the user terminal A an instruction to upload the fragment, and the user terminal A may upload the fragment 1 after receiving the instruction; upon completion of the uploading of the fragment 1, the user terminal sends the management server a request to upload fragment 2, and so on so forth.

Noticeably, the management server allocates the same fragmenting policy for the same file to be uploaded. That is to say, assume that three user terminals all find the file in the above example, the fragmenting policy sent to the three user terminals is dividing into three fragments, and size and serial numbers of the fragments should be consistent among user terminals. Certainly, additionally and noticeably, in practical application, user terminals do not necessarily find the same file at the same moment, but at different time. However, uploading each fragment in the aforesaid manner does not affect implementation of the embodiment of the present invention.

For example, the user terminal A finds a file firstly; after the file is fragmented according to the policy of the management server, fragment 1 is uploaded to the data server firstly; during the user terminal A's uploading of the fragment 1, user terminal B also finds the file, the management server also instructs the user terminal B to fragment the file according to the same policy; when the user terminal B initiates a request to upload fragment 1, the management server may instruct the user terminal B not to upload the fragment 1, and the user terminal B sends the management server a request to upload fragment 2; if no other user terminals upload the fragment 2 previously, the user terminal B may be instructed to upload the fragment 2, and then the user terminal B may begin to upload the fragment 2, and so on and so forth.

Noticeably, since the file has already been fragmented during the uploading, the fragments need to be packeted on the server side to obtain the complete file. In an embodiment of the present invention, since different fragments of the same file might be uploaded by different user terminals, data servers selected by the management server for different user terminals might vary with geographic locations of respective user terminals. As such, different fragments of the same file might be uploaded to different data servers. In this case, fragments of the same file uploaded by different user terminals may firstly routed to the same packeting server, and then the packeting server packets the fragments.

Upon specific implementation, the data server (equivalent to an uploading receiver) may be a cluster. Each data server may receive fragment uploading; after the fragments are uploaded to the data server, fragments may be routed to a packeted cluster by a fragment distribution process. Specifically, this process may firstly request to a scheduling center to obtain which packeting server the fragment should go. The scheduling center allocates a suitable packeting server to the distribution process according to md5 (Message Digest Algorithm version 5, which is a hash function extensively used in the field of computer security to provide integrity protection for the message) of the file, each packeting server starts a packeting worker to wait for packeting so that all fragments of the same file fall into the same set of packeting server.

Noticeably, the data server and packeting server in the embodiments of the present invention may be physically independent machines, or the same machine may be used to provide different services. Embodiments of the present invention focus on functionality upon depiction, which cannot be regarded as limitations of the present invention.

The scheduling center may be used to monitor a state of the packeting machine, and the scheduling center may be redundant, and hot swapped; when one fragment requests to the scheduling center, a corresponding packeting server may be found through hash algorithm according to md5 of the file. When a certain packeting server fails, the scheduling center detects the failure of the packeting server and configures the state as invalid, and meanwhile a backup machine is selected to replace the failed machine. Through the mechanism, a fault tolerance capability of the system may be improved, and reliable operation of the packeting server be ensured.

Furthermore, preferably, the uploading the file to the cloud server with the fragment as a unit comprises:

Step L11, sending the cloud server a request to upload the file in order of fragment serial numbers, the cloud server determining whether the current user terminal needs to upload the current fragment according to the uploaded fragments of the file by other user terminals;

Step L12: uploading the current fragment to the cloud server if a response message that the current fragment needs to be uploaded is received.

In absence of the response message, no file is uploaded.

Step 240: analyzing a security level of the unknown file and recording it.

To ensure providing a secure file to the user terminal, the cloud server needs to judge whether the file uploaded by the user terminal is a secure file; if it is a secure file, its security level is marked as secure. In other cases, corresponding security levels such as suspicious or poisoned, are marked for the file, and then the corresponding file characteristics information and corresponding security level are recorded, for example infected level.

In the above uploading procedure, the file according to the embodiments of the present invention may be stored solely, i.e., the same file is stored only one copy without repeated storage. For example, regarding user terminal A, the cloud server finds through the above steps that it has unknown files file1, file2, file3, then the user terminal A is notified to upload file1, file2 and file3 to the cloud server for storage, and the cloud server records the corresponding file characteristics information. Then, regarding user terminal B, when it includes file1, file3, and file4, the cloud server detects through the above steps that user terminal B includes the unknown file file4, and the user terminal B is notified to upload file4.

Furthermore, the analyzing the security level of the unknown file comprises:

Step S250: when the security level of the unknown file is infected level, looking up a corresponding secure file from the cloud server in combination with file log information, and notifying the user terminal to download the secure file;

When judging that the file uploaded by the user terminal is an infected file, the cloud server looks up a corresponding secure file from the cloud server according to the file log information, and notifies the user terminal to download the secure file.

When looking up the secure file corresponding to the infected file in the cloud server, a list of the secure files needs to be obtained according to the file log information. For example, the MD5 value of the file content is used to correspond to a file in embodiments of the present invention, since the file content MD5 value of one file before and after infection varies, it is impossible to look up a corresponding file stored by the cloud server according to MD5 value. For example, regarding the user terminal B's file1, file3 and file4, the file content MD5 value of their secure files are as follows:

6666666666666666666666666666AA, 6666666666666666666666666666BB, 6666666666666666666666666666CC;

Their paths all are: D: A\A.

The corresponding file content MD5 values after infection are as follows:

6666666666666666666666666666DD, 6666666666666666666666666666EE, 6666666666666666666666666666FF;

Wherein the path of file1 and file3 is D:A\A, and the path of file4 is E:B\B which is obtained from movement of D:A\A. According to the file log information obtained by scanning and monitoring the user terminal B, it is known that the file corresponding to MD5 value 6666666666666666666666666666DD is D: A\A\file1, and the corresponding content value of the secure version is 6666666666666666666666666666AA; The file corresponding to the MD5 value 6666666666666666666666666666EE is D: A\A\file3; the content value of the corresponding secure version is 6666666666666666666666666666BB; The file corresponding to the MD5 value 6666666666666666666666666666FF is D:A\A\file4, and the content value of the corresponding secure version is 6666666666666666666666666666666CC.

Corresponding secure file1, file3 and file4 may be queried from the cloud server according to the MD5 value of the secure version, and downloaded to the user terminal B. In the present embodiment, the user terminal obtaining or downloading the secure file comprises:

matching and obtaining the corresponding secure file from the cloud server based on the user terminal ID and the file characteristics information.

For example, in the form of the user terminal ID and PATH (path MD5)+TEXT(file content MD5)+VERSION (version identifier).

Step S260: replacing the unknown file of the user terminal with the secure file.

Wherein the unknown file confirmed by the cloud server as secure file may be added to a secure white list, and its signature information is recorded.

When the user terminal obtains a secure version of file corresponding to the infected file, i.e., obtains the secure file uploaded to the cloud before the file is infected, the infected file is replaced with the secure version of file.

In the present embodiment, the obtaining by the user terminal comprises:

matching and obtaining the corresponding secure file from the cloud server based on the user terminal ID and the file characteristics information.

When the cloud server does not have a secure version of file corresponding to the infected file, the infected file is repaired, isolated or deleted in a conventional repair manner using a security software.

Wherein replacing the unknown file of the user terminal with a secure file comprises: Step S30: when the infected unknown file has limits of operation authority, obtaining the operation authority of the file by invoking an authority obtaining function; the authority obtaining function is in a lower layer than a system authority authentication function layer;

Step S31: after obtaining the operation authority of the file, replacing the unknown file with a corresponding secure file.

In addition, replacing the unknown file with the secure file comprises:

The user terminal, by uploading the monitored file change information to the cloud server, looks up and obtains from the cloud server a secure file nearest to a current time point, and uses the secure file to replace the abnormal file or unknown file.

For example, when the user terminal A's file b.exe is uploaded to the cloud on Jan. 11, 2012, its MD5 value is a1, but the user terminal modifies the content of b.exe on Feb. 15, 2012 and its MD5 value becomes a2, then a2 is also uploaded to the cloud server, and both a1 and a2 are secure. However, it is found that the file b.exe is infected with virus through the above steps on Apr. 20, 2012, a nearest secure file of b.exe is looked up and obtained from the cloud according to the above method, namely, b.exe stored by the cloud server on Feb. 15, 2012, and the current infected file b.exe is replaced with the file b.exe dated Feb. 15, 2012.

In addition, after judging that the unknown file is infected, the method further comprises:

prompting the user terminal whether to permit replacement of the infected unknown file.

For example, after the infected unknown file is judged, the user terminal is asked whether to permit downloading the secure version of file and performing replacement, before the secure file which corresponds to the infected unknown file is downloaded from the cloud server.

If the user terminal does not permit, the conventional repair technology may be employed to repair the abnormal file.

In all systems, each file has operation authority thereof, for example, a Windows file has authorities such as full control, modification, read and run, read and write, as well as an operation authority to prohibit modification when the file is involved. According to the present invention, an operation authority of the file may be obtained by an authority obtaining drive. The present invention includes many specific technologies and methods for obtaining authority, which are not limited in the present invention.

Step 270: scanning a file at user terminal, judging whether the file is abnormal, and acquiring file characteristics information;

Step 280: if the file is abnormal, acquiring, according to the file characteristics information, from a cloud server a secure file corresponding to the abnormal file, wherein the secure file in the cloud server is acquired by directly uploading file of user terminal;

Step 290: replacing the corresponding abnormal file of the user terminal with the secure file.

Wherein steps 270, 280 and 290 are substantially identical with embodiment 1, wherein scanning and uploading the file may be executed concurrently or asynchronously.

In step 270, scanning whether the file of the user terminal is infected with virus may be performed by employing a virus characteristics database used by a conventional antivirus software carried by the user terminal itself, or performed by using a cloud searching and killing engine through comparison from the cloud server.

The file characteristics information of the file is obtained upon scanning. When the file characteristics information is obtained, processing the scanned file characteristics information in combination with the information obtained by monitoring the file changes, and obtaining the file characteristics information for ultimately querying a secure file corresponding to the abnormal file in the cloud server. For example, regarding D:\A\file1, if, after the user terminal uploads D:\A\file1, its name is changed to for example file6, its storage path also is changed, namely, E:\A\file6, the change procedure of file1 is monitored in the embodiments of the present invention. At this time, if file6 gets abnormal, it is known that the secure file corresponding to file6 is the original D:\A\file1. Then the information may be uploaded to the cloud server.

In the embodiment of the present invention, when an antivirus engine of the user terminal can confirm an infected file, the aforesaid file characteristics information thereof is sent to the cloud server. If the user terminal's antivirus engine cannot judge whether a file is abnormal, the file will be uploaded to the cloud server as an unknown file for virus checking and killing, and its file characteristics information is also uploaded to the cloud server.

In step 280, regarding the abnormal file, a secure version of file corresponding to the abnormal file is looked up from files stored in the cloud server based on the file characteristics information obtained from the aforesaid scanning and monitoring procedure, and then provided to the user terminal for downloading. When the user terminal downloads the secure file corresponding to the abnormal file, the flow proceeds to step 290 of replacing the abnormal file of the user terminal with the secure file.

Wherein, replacing the corresponding abnormal file of the user terminal with the secure file comprises:

Step S291: when the abnormal file has limits of operation authority, obtaining the operation authority of the file by invoking an authority obtaining function; the authority obtaining function is in a lower layer than a system authority authentication function layer;

Step S292: replacing the abnormal file with the secure file after obtaining the operation authority of the file.

In all systems, each file has operation authority, for example, a Windows file has authorities such as full control, modification, read and run, read and write, as well as an operation authority to prohibit modification when the file is involved. According to the present invention, an operation authority of the file may be obtained by an authority obtaining drive. The present invention includes many specific technologies and methods for obtaining authority, which are not limited in the present invention.

In addition, after judging that the file is abnormal, the method further comprises:

prompting the user terminal whether to permit replacement of the abnormal file.

For example, after judging the file is abnormal, the user terminal is asked whether to permit downloading the secure version of file and performing replacement, before the secure file without abnormity which corresponds to the abnormal file is downloaded from the cloud server.

If the user terminal does not permit, the conventional repair technology may be employed to repair the abnormal file.

Figure 3:
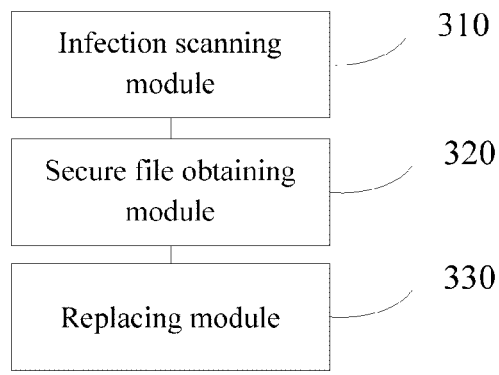
FIG. 3 illustrates a block diagram of an apparatus for repairing a file at user terminal according to an embodiment of the present invention.

Referring to FIG. 3, it illustrates a block diagram of an apparatus for repairing a file at user terminal according to the present invention, comprising:

an infection scanning module 310 configured to scan a file at user terminal, judge whether the file is abnormal, and acquire file characteristics information;

a secure file obtaining module 320 configured to, if the file is abnormal, acquire, according to the file characteristics information, from a cloud server a secure file corresponding to the abnormal file, wherein the secure file in the cloud server is acquired by directly uploading file of user terminal;

a replacement module 330 configured to replace the corresponding abnormal file of the user terminal with the secure file.

The replacement module comprises:

a replacement unit configured to obtain an operation authority of the file by a authority obtaining drive when the abnormal file has limits of operation authority.

wherein the infection scanning module may exist in either the user terminal or the cloud server.

In addition, it further comprises a replacement prompting module configured to prompt the user terminal whether to permit replacement of the abnormal file.

Figure 4:
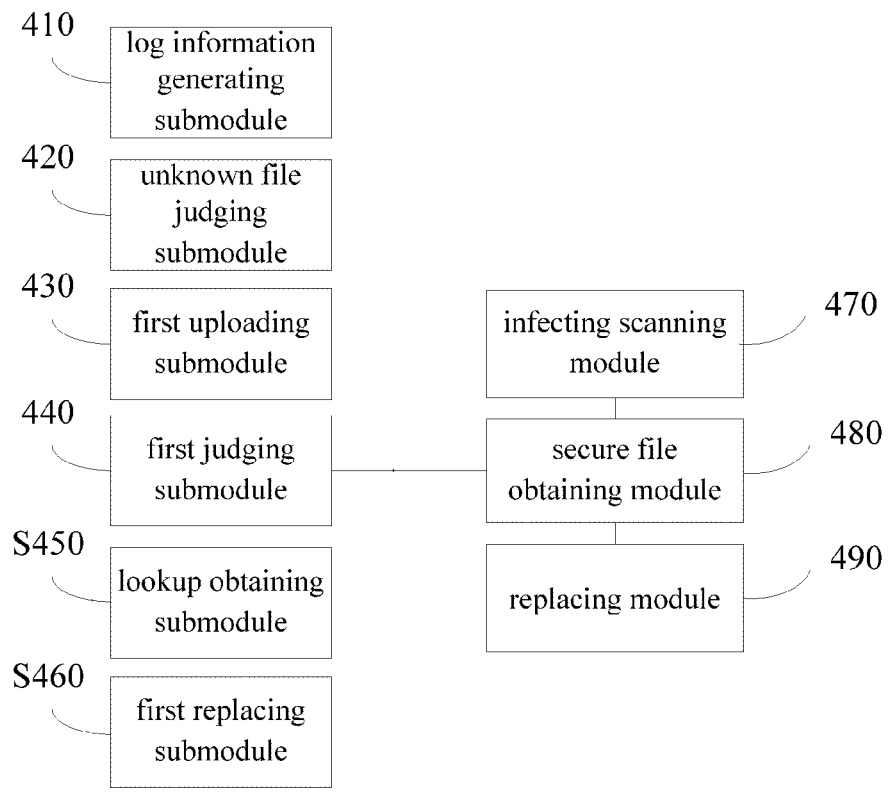
FIG. 4 illustrates a block diagram of an apparatus for repairing a file at user terminal according to an embodiment of the present invention.

Referring to FIG. 4, it illustrates a block diagram of an apparatus for repairing a file at user terminal according to a preferred embodiment of the present invention, comprising:

a file updating module comprises:

a log information generating submodule 410 configured to scan file characteristics information of file of each user terminal, and generate a file information log in combination with the monitored changes of the file;

an unknown file judging submodule 420 configured to compare the file characteristics information of the file information log with the file characteristics information recorded in the cloud server and judge whether there is an unknown file;

a first uploading submodule 430 configured to, if there exists the unknown file, notify the user terminal to upload the unknown file to the cloud server;

a first judging submodule 440 configured to analyze a security level of the unknown file and record it.

Preferably, further comprises:

a lookup obtaining submodule S450 configured to, when the security level of the unknown file is abnormal level, look up a corresponding secure file from the cloud server in combination with the file log information, and notify the user terminal to download the secure file;

a first replacing submodule S460 configured to replace the unknown file of the user terminal with the secure file.

an infection scanning module 470 configured to scan a file at user terminal, judge whether the file is abnormal, and acquire file characteristics information;

a secure file obtaining module 480 configured to, if the file is abnormal, acquire, according to the file characteristics information, from a cloud server a secure file corresponding to the abnormal file, wherein the secure file in the cloud server is acquired by directly uploading file of user terminal;

a replacing module 490 configured to replace the corresponding abnormal file of the user terminal with the secure file.

Wherein the unknown file judging submodule comprises:

a first unknown judging module configured to, compare the file log information currently generated by the user terminal with previously-recorded file log information of the user terminal, and judge whether there exists a first unknown file log information which does not exist in the file log information recorded by the cloud server and corresponding to the user terminal;

a second unknown judging module configured to, if there exists the first unknown file log information, compare the file characteristics information in the first unknown file log information with the file characteristics information recorded in the cloud server, and judge whether there exists an unknown file.

Wherein the first unknown judging module comprises:

a second uploading submodule configured to, upload the file log information currently generated by the user terminal to the cloud server;

a second judging module configured to compare the file log information currently received by the cloud server with the file information log recorded by the cloud server and corresponding to the user terminal, and obtain the first unknown file log information which does not exist in the file log information recorded by the cloud server and corresponding to the user terminal.

Wherein the first uploading submodue comprises:

a file fragmenting unit 202 configured in a way that the user terminal receives a fragmenting policy returned by the cloud server, and fragments the file to be uploaded according to the fragmenting policy;

a fragment uploading unit 203 configured in a way that the user terminal uploads the file to the cloud server with the fragment as a unit, wherein if different user terminals find the same file to be uploaded, different fragments of the same file to be uploaded are uploaded concurrently by the respective user terminals.

Wherein upon storing the file log information, the apparatus comprises:

an information extracting module configured to structure the file characteristics information with a structure including the file path at user terminal, a characteristic value corresponding to the file content and file version to obtain the structured file characteristics information;

an information storing module configured to identify security level for the structured file characteristics information according to the security level of the file, and store the structured file characteristics information with security level identified in a file information log corresponding to the user terminal.

Wherein the replacing module or the first replacing module comprises:

an authority obtaining unit configured to, when the abnormal file or the infected unknown file has limits of operation authority, obtain the operation authority of the file by invoking an authority obtaining function; the authority obtaining function is in a lower layer than a system authority authentication function layer;

a replacing unit configured to replace the abnormal file or unknown file with the corresponding secure file after obtaining the operation authority of the file.

There is further included a replacement prompting module configured to prompt the user terminal whether to permit replacement of the abnormal file and/or infected unknown file.

Figure 5:
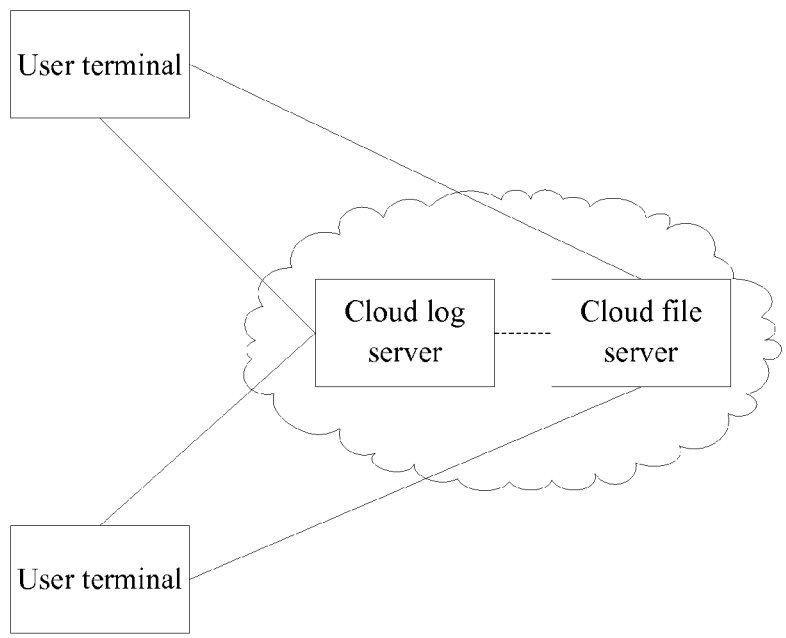
FIG. 5 illustrates a block diagram of a system for repairing a file at user terminal according to an embodiment of the present invention.

Referring to FIG. 5, it illustrates a block diagram of a system for repairing a file at user terminal according to the present invention, comprising:

User terminals and a cloud server, wherein the cloud server comprises a cloud log server and a cloud file server.

Each user terminal is configured to upload an unknown file and file log information and judge whether the file is infected with virus.

The cloud log server is configured to store the file log information uploaded by each user terminal, and the file characteristics information in corresponding relationship with files in the file server.

The cloud file server is configured to store the file uploaded by the user terminal, judge whether the file is abnormal and provide the secure file to the user terminal for downloading.

Specific functions of modules are as stated in the above method embodiments and will not be detailed here.

Since system embodiments are substantially similar to method embodiments, they are described simpler. Reference may be made to relevant portions of the method embodiments.

Embodiments of the present description all are described in a progressive manner, reference may be made to identical or similar portions of embodiments, and each embodiment focuses on differences from other embodiments.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus for repairing file at user terminal according to embodiments of the present invention. The present invention may also be implemented as an apparatus or device program (e.g., computer program and computer program product) for executing part or all methods described here. Such programs implementing the present invention may be stored in a computer-readable medium, or may be in a form having one or more signals. Such signals can be obtained by downloading from the Internet, or provided on a carrier signal or provided in any other forms.

Figure 6:
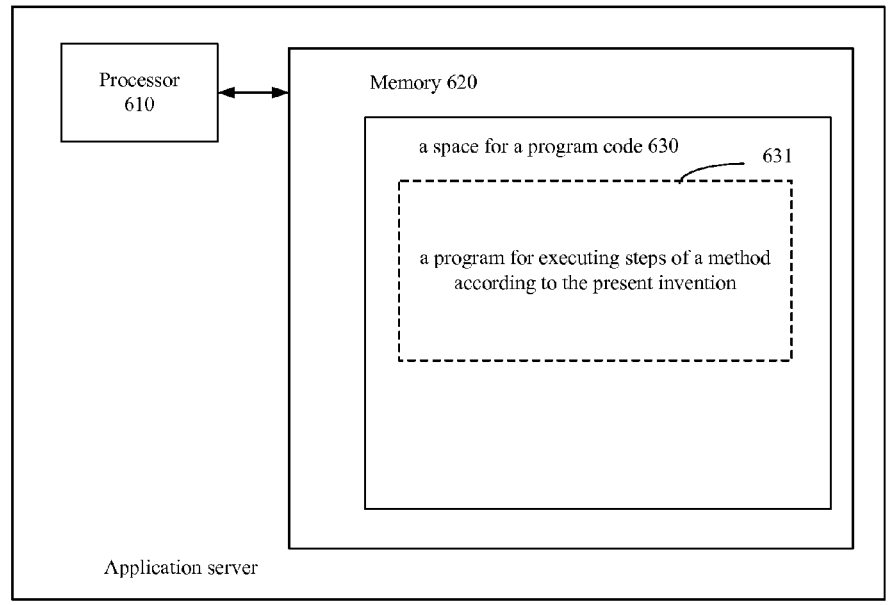
FIG. 6 illustrates a block diagram of a server for executing the method according to the present invention.
Figure 7:
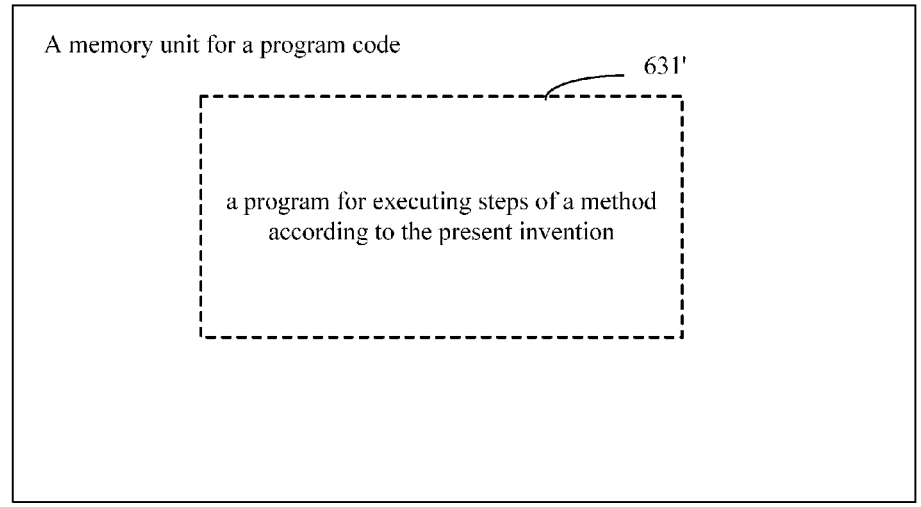
FIG. 7 illustrates a memory unit for maintaining or carrying a program code for implementing the method according to the present invention.

For example, FIG. 6 illustrates a server, for example, an application server, which can implement a method for repairing a file at user terminal according to the present invention. The server conventionally comprises a processor 610 and a computer program product or computer-readable medium in the form of a memory 620. The memory 620 may be a flash memory, EEPROM (Electrically Erasable Programmable Read-Only Memory), EPROM, hard disk or ROM-like electronic memory. The memory 620 has a storage space 630 for a program code 631 for executing any step of the above method. For example, the storage space 630 for the program code may comprise program codes 631 respectively for implementing steps of the above method. These program codes may be read from one or more computer program products or written into one or more computer program products. These computer program products comprise program code carriers such as hard disk, compact disk (CD), memory card or floppy disk. Such computer program products are usually portable or fixed memory units as shown in FIG. 7. The memory unit may have a storage section, a storage space or the like arranged in a similar way to the memory 620 in the server of FIG. 6. The program code may for example be compressed in a suitable form. Usually, the memory unit includes a computer-readable code 631', namely, a code readable by a processor for example similar to 610. When these codes are run by the server, the server is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

What is claimed is:

1. A method for repairing a file at a user terminal, comprising:
   scanning, by at least one processor, a file at the user terminal, determining whether the file is infected, and acquiring file characteristics information;

if the file is infected, acquiring, by the at least one processor, according to the file characteristics information, from a cloud server a secure file corresponding to the infected file and uploaded before an abnormity occurred, wherein the secure file in the cloud server is acquired by directly uploading the file of the user terminal; and replacing, by the at least one processor, the infected file of the user terminal with the secure file;

wherein acquiring the secure file in the cloud server by directly uploading the file of the user terminal comprises:

scanning file characteristics information of the file of the user terminal, and generating file information log in combination with monitored changes of the file;

comparing the file characteristics information of the file information log with the file characteristics information recorded in the cloud server and determining whether there is an unknown file;

if the unknown file exists, notifying the user terminal to upload the unknown file to the cloud server, the user terminal receiving a fragmenting policy returned by the cloud server, and fragmenting the unknown file to be uploaded according to the fragmenting policy; and the user terminal uploading the fragmented file to the cloud server as a unit, wherein if different user terminals upload a same file, different fragments of the same file to be uploaded are uploaded concurrently by respective user terminals.

2. The method according to claim 1, wherein acquiring the secure file in the cloud server by directly uploading the file of the user terminal further comprises:

analyzing a security level of the unknown file and recording the security level of the unknown file.

3. The method according to claim 2, wherein analyzing the security level of the unknown file comprises:

when the security level of the unknown file is an infected level, looking up the secure file from the cloud server in combination with the file log information, and notifying the user terminal to download the secure file; and replacing the unknown file of the user terminal with the secure file.

4. The method according to claim 2, wherein comparing the file characteristics information of the file information log with the file characteristics information recorded in the cloud server and determining whether there is the unknown file comprises:

comparing the file log information currently generated by the user terminal with previously-recorded file log information of the user terminal, and determining whether a first unknown file log information exists that does not exist in the file log information recorded by the cloud server and corresponding to the user terminal; and if the first unknown file log information exists, comparing the file characteristics information in the first unknown file log information with the file characteristics information recorded in the cloud server, and determining whether the unknown file exists.

5. The method according to claim 4, wherein comparing the file log information currently generated by the user terminal with previously-recorded file log information of the user terminal, and determining whether the first unknown file log information exists that does not exist in the file log information recorded by the cloud server and corresponding to the user terminal comprises:

uploading the file log information currently generated by the user terminal to the cloud server; and comparing the file log information currently received by the cloud server with the file log information recorded by the cloud server and corresponding to the user terminal, and obtaining the first unknown file log information that does not exist in the file log information recorded by the cloud server and corresponding to the user terminal.

6. The method according to claim 5, wherein upon recording the file log information, the method comprises:

structuring the file characteristics information with a structure including a file path at the user terminal, a characteristic value corresponding to file content and a file version to obtain the structured file characteristics information; and identifying the security level for the structured file characteristics information according to the security level of the file, and storing the structured file characteristics information with the security level identified in the file information log corresponding to the user terminal.

7. The method according to claim 1, wherein upon replacing with the secure file, the method comprises:

when the infected file or the unknown file has limits of operation authority, obtaining the operation authority of the file by invoking an authority obtaining function; and replacing the infected file or unknown file with the corresponding secure file after obtaining the operation authority of the file.

8. The method according to claim 1, wherein when the user terminal obtains or downloads the secure file, the method comprises:

matching and obtaining the corresponding secure file from the cloud server based on a user terminal ID and the file characteristics information.

9. The method according to claim 1, wherein upon replacing with the secure file, the method comprises:

the user terminal, by uploading monitored file change information to the cloud server, looks up and obtains from the cloud server a secure file nearest to a current time point, and uses the secure file to replace the infected file.

10. The method according to claim 1, wherein, the file characteristics information comprises an MD5 value of file content, and/or storage path information of the file, and/or change information of the file.

11. The method according to claim 1, wherein, uploading the fragmented file to the cloud server comprises:

sending the cloud server a request to upload the file in order of fragment serial numbers, the cloud server determining whether the user terminal needs to upload a current fragment according to the uploaded fragments of the file by other user terminals; and uploading the current fragment to the cloud server if a response message that the current fragment needs to be uploaded is received.

12. An apparatus for repairing a file at a user terminal, comprising:

a memory having instructions stored thereon; and at least one processor to execute the instructions to perform operations for repairing a file at the user terminal, the operations comprising:

scanning a file at the user terminal, determining whether the file is infected, and acquiring file characteristics information;

if the file is infected, acquiring, according to the file characteristics information, from a cloud server a secure file corresponding to the infected file and uploaded before an abnormity occurred, wherein the secure file in the cloud server is acquired by directly uploading the file of the user terminal; and replacing the infected file of the user terminal with the secure file;

wherein the operation of acquiring the secure file in the cloud server by directly uploading the file of the user terminal comprises:

scanning file characteristics information of the file of the user terminal, and generating file information log in combination with monitored changes of the file;

comparing the file characteristics information of the file information log with the file characteristics information recorded in the cloud server and determining whether there is an unknown file;

if the unknown file exists, notifying the user terminal to upload the unknown file to the cloud server, the user terminal receiving a fragmenting policy returned by the cloud server, and fragmenting the unknown file to be uploaded according to the fragmenting policy; and the user terminal uploading the fragmented file to the cloud server as a unit, wherein if different user terminals upload a same file, different fragments of the same file to be uploaded are uploaded concurrently by respective user terminals.

13. The apparatus according to claim 12, wherein the operation of acquiring the secure file in the cloud server by directly uploading the file of the user terminal further comprises:

analyzing a security level of the unknown file and recording the security level of the unknown file.

14. The apparatus according to claim 13, wherein the operation of analyzing the security level of the unknown file comprises:

when the security level of the unknown file is an infected level, looking up the secure file from the cloud server in combination with the file log information, and notifying the user terminal to download the secure file; and replacing the unknown file of the user terminal with the secure file.

15. The apparatus according to claim 13, wherein the operation of comparing the file characteristics information of the file information log with the file characteristics information recorded in the cloud server and determining whether there is the unknown file comprises:

comparing the file log information currently generated by the user terminal with previously-recorded file log information of the user terminal, and determining whether a first unknown file log information exists that does not exist in the file log information recorded by the cloud server and corresponding to the user terminal; and if the first unknown file log information exists, comparing the file characteristics information in the first unknown file log information with the file characteristics information recorded in the cloud server, and determining whether the unknown file exists.

16. The apparatus according to claim 15, wherein the operations of comparing the file log information currently generated by the user terminal with previously-recorded file log information of the user terminal, and determining whether the first unknown file log information exists that does not exist in the file log information recorded by the cloud server and corresponding to the user terminal comprise:

uploading the file log information currently generated by the user terminal to the cloud server; and comparing the file log information currently received by the cloud server with the file log information recorded by the cloud server and corresponding to the user terminal, and obtaining the first unknown file log information that does not exist in the file log information recorded by the cloud server and corresponding to the user terminal.

17. The apparatus according to claim 16, wherein upon recording the file log information, the operations comprise:

structuring the file characteristics information with a structure including a file path at the user terminal, a characteristic value corresponding to file content, and a file version to obtain the structured file characteristics information; and identifying the security level for the structured file characteristics information according to the security level of the file, and storing the structured file characteristics information with the security level identified in the file information log corresponding to the user terminal.

18. The apparatus according to claim 12, wherein upon replacing with the secure file, the operations comprise:

when the infected file or the unknown file has limits of operation authority, obtaining the operation authority of the file by invoking an authority obtaining function; and replacing the infected file or unknown file with the corresponding secure file after obtaining the operation authority of the file.

19. A non-transitory computer readable medium having instructions stored thereon that, when executed by at least one processor, cause the at least one processor to perform operations for repairing a file at a user terminal, comprising:

scanning a file at the user terminal, determining whether the file is infected, and acquiring file characteristics information;

if the file is infected, acquiring, according to the file characteristics information, from a cloud server, a secure file corresponding to the infected file and uploaded before an abnormity occurred, wherein the secure file in the cloud server is acquired by directly uploading the file of the user terminal; and replacing the corresponding infected file of the user terminal with the secure file;

wherein the operation of acquiring the secure file in the cloud server by directly uploading the file of the user terminal comprises:

scanning file characteristics information of the file of the user terminal, and generating file information log in combination with monitored changes of the file;

comparing the file characteristics information of the file information log with the file characteristics information recorded in the cloud server and determining whether there is an unknown file;

if the unknown file exists, notifying the user terminal to upload the unknown file to the cloud server, the user terminal receiving a fragmenting policy returned by the cloud server, and fragmenting the unknown file to be uploaded according to the fragmenting policy; and the user terminal uploading the fragmented file to the cloud server as a unit, wherein if different user terminals upload a same file, different fragments of the same file to be uploaded are uploaded concurrently by respective user terminals.

* * * * *